Inventor
Albert R. Thompson
By Lyon & Lyon
Attorneys

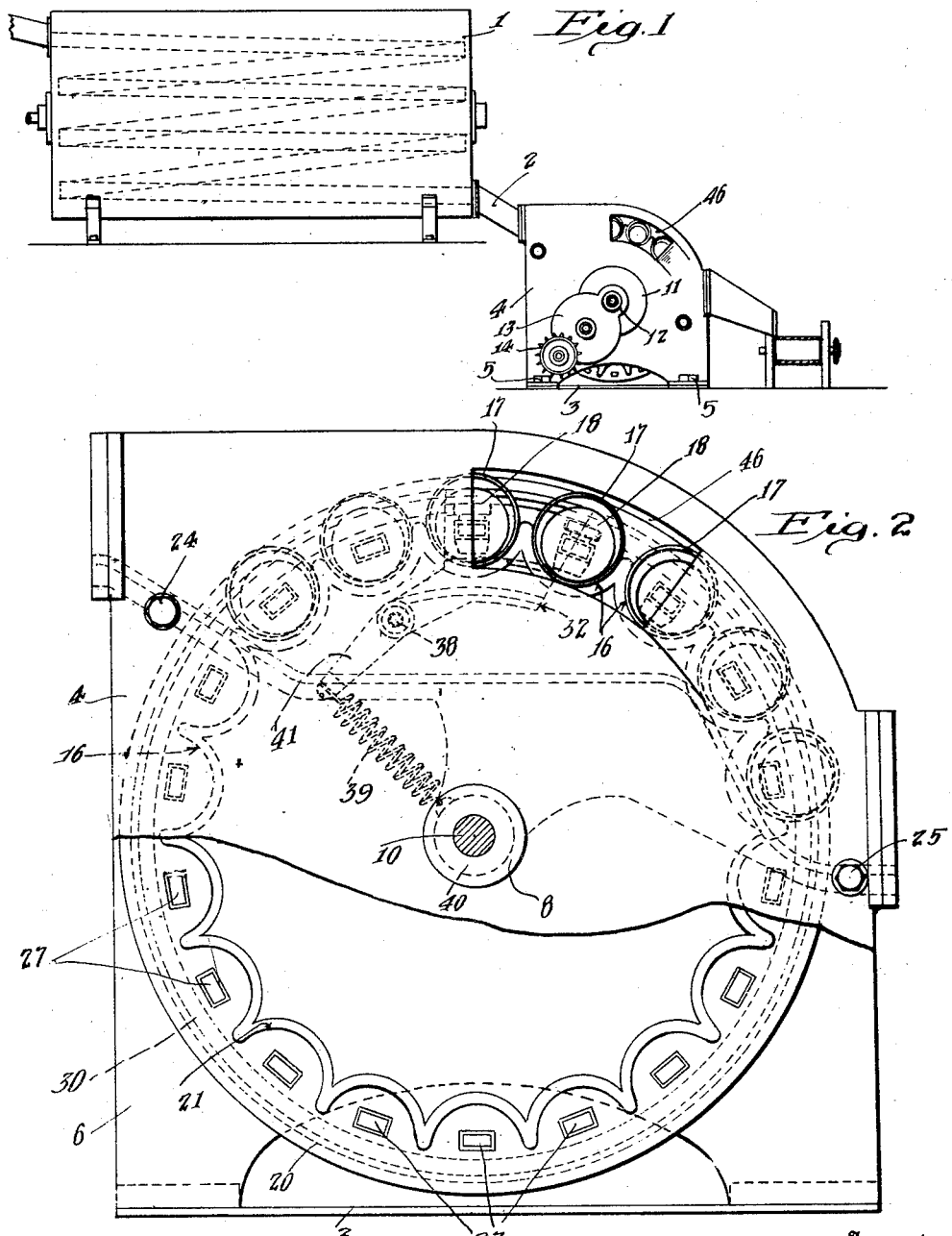
Nov. 17, 1931. A. R. THOMPSON 1,832,062
LEAK DETECTOR FOR CANS IN CARTRIDGES
Filed April 26, 1928 3 Sheets-Sheet 1
Inventor
Albert R. Thompson Nov. 17, 1931. A. R. THOMPSON 1,832,062
LEAK DETECTOR FOR CANS IN CARTRIDGES
Filed April 26, 1928 3 Sheets-Sheet 2

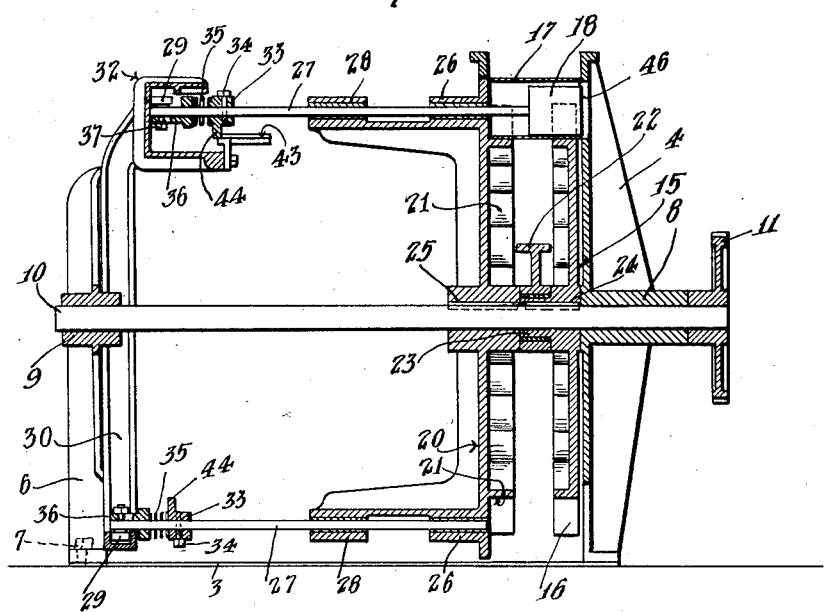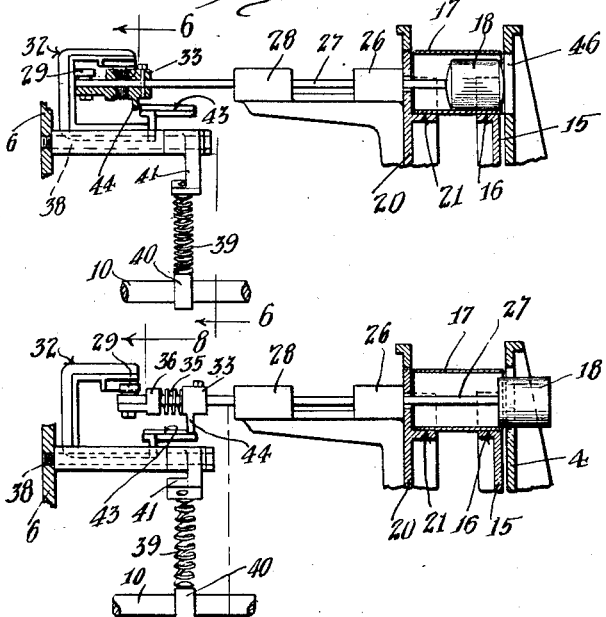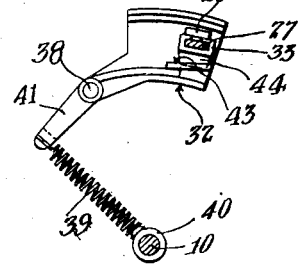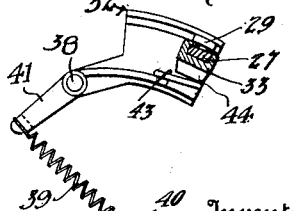

Patented Nov. 17, 1931

1,832,062

UNITED STATES PATENT OFFICE

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA

LEAK DETECTOR FOR CANS IN CARTRIDGES

Application filed April 26, 1928. Serial No. 273,103.

This invention relates to a leak detector for hermetically sealed cans mounted within cartridges and relates more particularly to a means adapted to detect leaky cans while the same are mounted within cartridges and to eject the defectively sealed or leaky cans from the cartridges.

In the canning art it is common practice to mount small cans in cartridges after the cans have been hermetically sealed to subject the contents of the cans to heat treatments and to what is known in the art as the "final cook". The cartridges are used to enable the cans to be passed through apparatus which are designed to handle larger cans and to enable the canner to process the goods contained in smaller cans without having apparatus particularly designed to handle the small cans. In passing these small cans through detecting means to detect the cans having leaks therein, it has heretofore been necessary to remove the cans from the cartridges, pass the cans through a leak detector and then replace the cans in the cartridges to complete the canning process.

It is the principal object of this invention to provide a method and apparatus which may be employed for detecting defectively sealed cans while the cans are within their cartridges and the ejecting of the defectively sealed cans from the cartridges, thereby eliminating the necessity of removing from and replacing the cans in said cartridges in order to detect the imperfectly or defectively sealed cans.

Another object of this invention is to provide an apparatus for detecting leaky cans within cartridges, including a carrier for the cartridges and means adapted to engage the cans within the cartridges and detect automatically the leaky cans within the cartridges due to the differences in the bulging in the ends of the perfectly and imperfectly sealed cans, the bulging being caused by the heated contents of the cans and to eject the leaky cans from the said cartridges.

Other objects and advantages of this invention it is believed will be apparent from the following detailed description of a preferred embodiment thereof as illustrated in the accompanying drawings.

In the drawings:

Figure 1 is a diagrammatic view of a leak detector embodying this invention illustrating the same as operatively connected with the heat treating chamber from which the cans are passed to the leak detector.

Figure 2 is a detached front elevation with the front plate partly broken away of a leak detector embodying this invention.

Figure 4 is a fragmental sectional view of the leak detector embodying this invention illustrating the first step toward ejecting of a defectively sealed can from its cartridge.

Figure 5 is a fragmental sectional view illustrating the defectively sealed can detecting means embodied in this invention as engaged with a properly sealed can.

Figure 6 is a sectional view taken substantially on line 66 of Figure 5.

Figure 7 is a fragmental sectional view similar to Figure 6 illustrating the ejection of a defectively sealed can.

Figure 8 is a sectional view taken substantially on line 88 of Figure 7.

Figure 3:
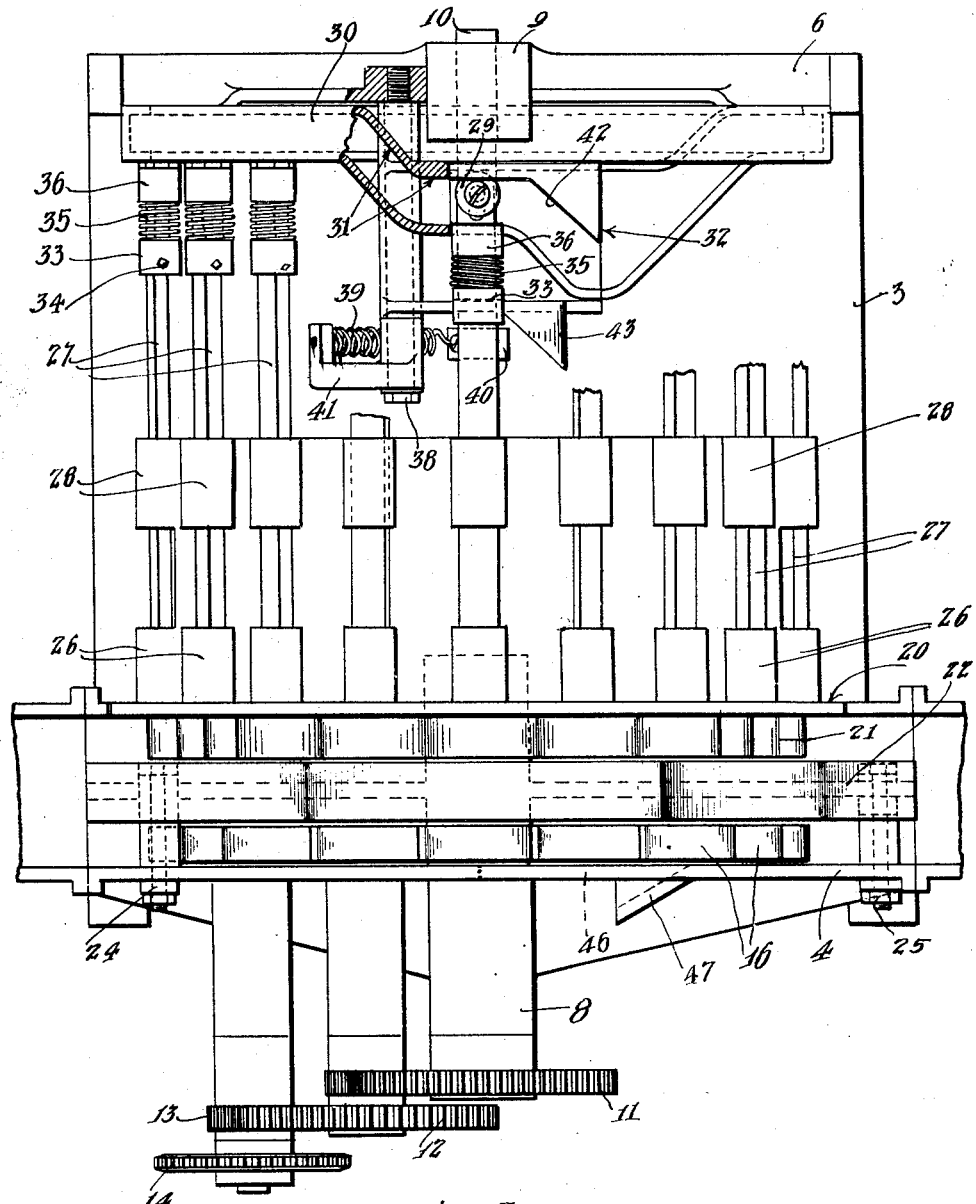
Figure 3 is a plan view partly in section of the leak detector embodying this invention.

In the preferred embodiment of this invention illustrated in the accompanying drawings 1 indicates a heat treating chamber through which cans are adapted to be passed in cartridges and from which the cans pass through a chute 2 to the leak detector embodying this invention.

The leak detector embodying this invention preferably includes a base plate 3 to which an end plate 4 is secured as illustrated at 5. A second end plate 6 is secured to the base 3 as indicated at 7. The end plates 4 and 6 are provided with hubs 8 and 9 within which the shaft 10 is journaled. The shaft 10 is driven through gears 11, 12 and 13 from a drive sprocket 14 which is connected with any suitable form of power device.

A rotor for transferring the cans within their cartridges is secured to and driven by the shaft 10 and is preferably of the following construction:

A driving disc 15 is secured to the shaft 10 and provides pockets 16 into which the cartridges 17 carrying the cans 18 are delivered from the chute 2. Secured to the shaft 10 is a second disc 20 which is spaced from the end plate 4 a distance slightly greater than the length of the cartridges 17. The cartridges 17 may be of a length substantially the same as the length of a standard size larger can. The disc 20 has formed on its inner periphery pockets 21 which forms a bearing support for the end of the cartridge 17.

Means are provided for guiding the cans into the pocket 16 and for guiding the cans outwardly from the pocket 16 and out of the detecting device, which means preferably comprise a guide 22 which is journaled on the cylindrical extension 23 of the hub of the disc 15 and is secured at its ends to the plate 4 as illustrated at 24 and 25.

Means provided for detecting the defectively sealed or leaky cans within the cartridges 17 are preferably of the following construction:

The disc 20 provides a driving disc for the detecting and ejecting means and for this purpose provides spaced bosses 26 within which the detector or ejecting rods 27 are journaled. Formed preferably integral with the driving disc 20 are a second series of bosses forming bearing members 28 through which the rods 27 extend. The rods 27 at their outer end carry rollers 29 which normally ride within tracks 30. When the rollers 29 are riding in the track 30, the push rods 27 are held in position to engage the ends of the cans 18 within the cartridges 17.

The push rods 27 cause the cans 18 to move within the cartridges 17 into the position illustrated in Figure 5 when the rollers 29 pass through the raised section 31 of the track 30. The rods 27 are provided with collars 33 which are secured to the rods 27 by means of pins 34. Springs 35 are mounted on the rods 27 to engage the collars 33 at one end and slides 36 at their opposite ends. The slides 36 carry the rollers 29 on pins 37.

A cam block 32 is pivotally supported on a pivot 38 and is yieldably held out of operative position by means of a spring 39. The spring 39 is secured at one end to a collar 40 journaled on the shaft 10 and at its opposite end to an arm 41 formed integral with the block 32. The block 32 is normally raised above the track 30 and provides a cam and a cam track 42 over which the rollers 29 are caused to travel when the rods 27 engage defectively sealed cans 18 in the cartridges 17. The rollers 29 riding over the cam track 42 moves the rods 27 to eject the defectively sealed cans having nonbulging ends.

In order to lower the cam block 32 into position so that the roller 29 will pass over the cam track 42 to move the rods 27 to eject the defectively sealed cans, the following construction is preferably provided: On engaging a defectively sealed can the push rod moves inwardly a greater distance than that distance determined by the bulged ends of a perfectly sealed can. This inward movement of the rod 27 moves inwardly the collar 33 causing the lip 44 to engage the surface 43 of the cam block 32. On further movement of the push rod 27 the lip 44 depresses the surface 43 and lowers the cam block 32 against the tension of the spring from the position illustrated in Figure 5 to that illustrated in Figure 6. The roller 29 then engages and rides within track 42 which causes the end movement of the push rod 27 to eject the defective can 18 from the cartridge 17.

Formed at the edge of the ejecting opening 46 through which the defectively sealed cans are ejected through the plate 4 is a return guide 47 which provides an inclined guide for returning the properly sealed cans 18 into proper position within the cartridges 17, the properly sealed cans 18 having been urged to a position by the push rods 27 slightly beyond the ends of the cartridges 17.

Having fully described my invention, it is to be understood that I do not wish to be limited to the details herein set forth, but my invention is of the scope of the appended claims.

I claim:

1. In an apparatus of the class described, the combination of means for transferring cans in cartridges, means adapted to enter said cartridges and for engaging the ends of the cans in said cartridges, the latter said means being effected by the extent of the end-bulge of the cans to cause defectively sealed cans to be ejected from the transfer means.

2. In an apparatus for detecting imperfectly sealed cans in cartridges, the combination of means for holding the cartridges with the cans therein, means adapted to engage the ends of the cans in said cartridges, the latter said means being held inoperative when the ends of said cans are convexed outwardly to hold said engaging means, and being operative when the ends of said cans are of less than a predetermined convexity to eject the latter said cans from the holding means.

3. In an apparatus for detecting imperfectly sealed cans in cartridges, the cans having been passed through a heated chamber to bulge their ends, and means for holding the cartridges with the cans therein, means adapted to enter the cartridges and to engage the ends of the cans within the cartridges, and means operatively connected with the engaging means, and the latter said means having its operation determined by the degree of bulging of the can ends within said cartridges to actuate the engaging means to eject from the holding means the cans having their ends bulged less than a predetermined amount.

4. In an apparatus of the class described, the combination of a carrier for cartridges containing cans having outwardly convexed ends due to the pressure expansion of the cans from the interior, means adapted to yieldably engage one end of said can within said cartridges to detect defectively sealed cans, and means operatively connected with the latter said means for ejecting said defectively sealed cans from said cartridge carrier.

5. In an apparatus of the class described, the combination of a carrier for cartridges containing heated cans, the cans having outwardly convexed ends due to the expansion of their contents, means for yieldably engaging one end of said cans within said cartridges to detect defectively sealed cans, and cam means operatively connected with said defective can detecting means for actuating said detecting means to eject said defective cans from said carrier.

6. In a leaky can detector, the combination of a cartridge carrier for said cans, the cans being heated to expand their contents and outwardly convex their ends, of a yieldably held push rod adapted to engage one end of said cans within said cartridges, a cam roller secured to said rod, a cam way in which said cam roller normally rides, a second cam way in which said cam roller rides to actuate the push rod to eject a leaky can from the carrier, the leaky can having a substantially unexpended end, and means for directing said cam roller into the second said cam way when the end of said leaky can permits said push rod to move longitudinally a distance greater than that determined by the outwardly convexed end of a properly sealed can.

Signed at San Jose, Calif., this 23d day of March, 1928.

ALBERT R. THOMPSON.